Jan. 15, 1963 L. R. MITCHELL 3,073,349
FLUID METERING DEVICE
Filed June 4, 1959
2 Sheets-Sheet 2
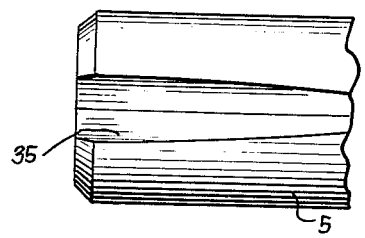
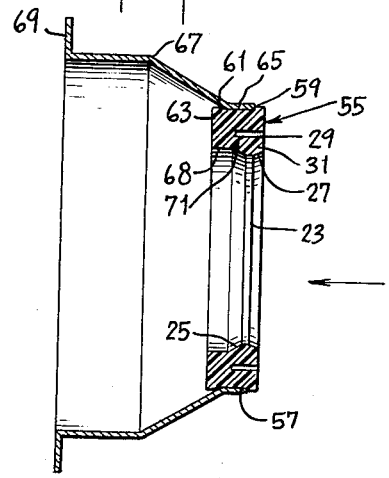
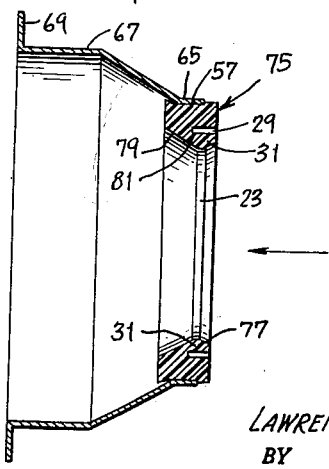
INVENTOR.
LAWRENCE RAYMOND MITCHELL
BY
Robert S. Dunham
ATTORNEY

United States Patent Office 3,073,349
Patented Jan. 15, 1963

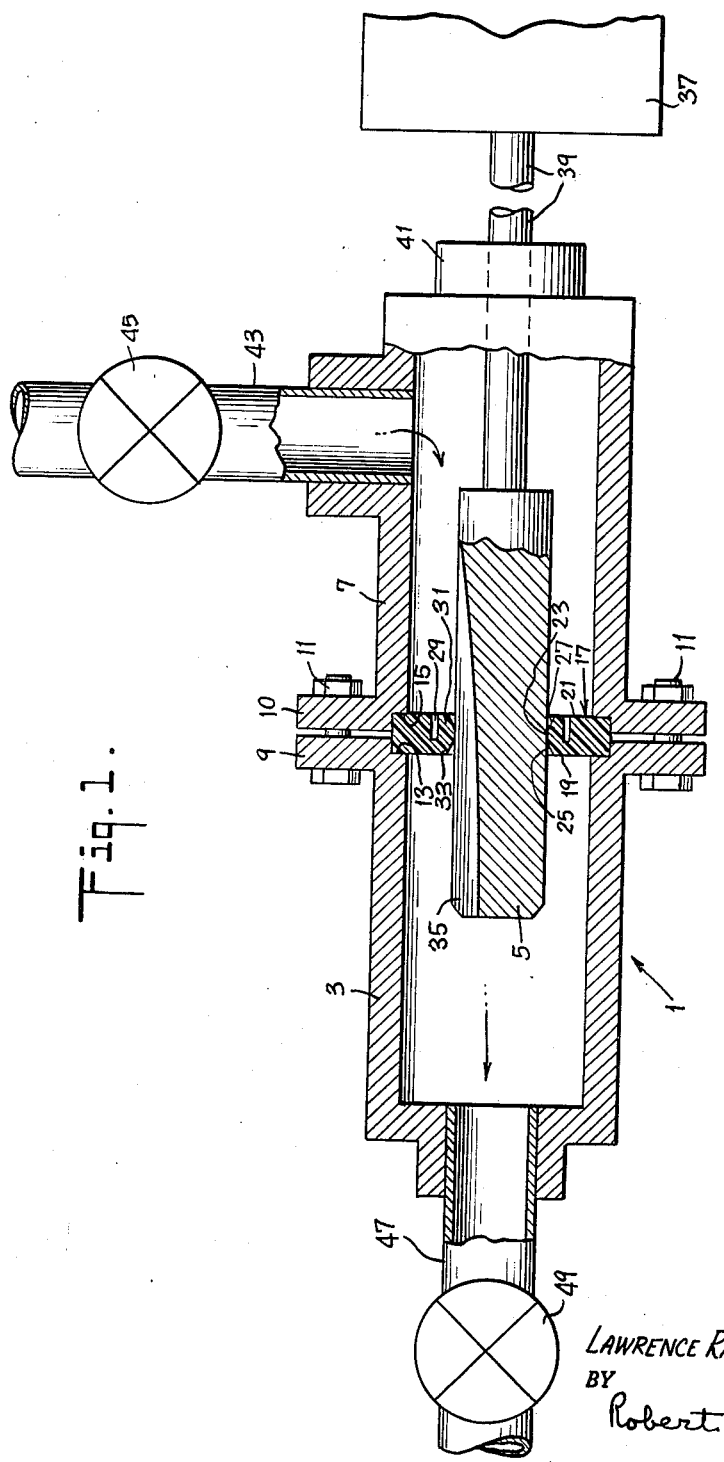

3,073,349
FLUID METERING DEVICE
Lawrence Raymond Mitchell, Fort Lee, N.J., assignor to Wallace & Tiernan Incorporated, Belleville, N.J., a corporation of Delaware
Filed June 4, 1959, Ser. No. 818,174
6 Claims. (Cl. 138—45)

This invention relates to apparatus for controlling the flow of a fluid and more especially relates to a device for metering the fluid flow. The invention particularly relates to means providing a flow orifice which determines the amount of the fluid flow and which may be adjusted for determining different amounts of fluid flow.

In metering and control devices for the purposes above referred to, and particularly in apparatus such as that disclosed in the copending application of Charles F. Wallace and John O. Kirwan, Serial No. 647,652, filed March 21, 1957, now United States Patent 2,929,393, issued March 22, 1960, there have been provided heretofore a chamber and an elongated metering element or rod, sometimes called a plug, disposed in the chamber, this element being provided with a lengthwise channel open along its length at the exterior surface of the element, means being disposed within the chamber cooperating with the elongated element to define therewith and with the surface of the channel a metering orifice. The element ordinarily has been supported for lengthwise movement thereof, the channel being of varying cross section along its length so that by such movement of the element the area of the flow orifice is changed. Metering indication has been accomplished by tubular connections to a conventional manometer from the pressure volumes at either side of the flow orifice thus formed.

In such prior constructions the problem has arisen of securing and maintaining pressure sealing engagement of the movable elongated element with the periphery of an opening through which the element is movable, this opening being provided by means supported by a wall extending transversely of the metering chamber and separating the two pressure volumes. It has been found difficult, moreover, to secure this sealing engagement without undue friction between the exterior surface of the movable element and the peripheral surface of the opening through which it extends. Low friction is desired in order that the element may be moved sensitively to secure small increments and decrements of cross sectional area of the orifice defined between the periphery of the opening and the surface of the channel formed in the elongated element. This low friction condition, however, has not been secured because of the necessity of providing a close fit of the means providing the opening upon the exterior surface of the movable element. Such close fit has involved wear which has produced a change in the size of the opening or of the movable element or both, thus decreasing the accuracy of the measurement because of leakage. Changes in the temperature of the fluid being metered also have caused contraction or expansion of the means providing the opening or of the movable element or both with resulting changes in the dimensional relations which have produced variations in the accuracy because of leakage or because of high friction or both.

In the endeavor to meet the conditions above mentioned a material has been sought for the means providing the opening through which the movable element moves which is sufficiently elastic while having a low coefficient of friction and a low coefficient of thermal expansion as well as providing the desirable hardness to limit wear. For this purpose it has been proposed to use for an orifice member providing the opening plastics having in some measure the characteristics above mentioned. It has been found, however, because of difficulties in machining and in fabrication and because of physical characteristics of the materials utilized, that the close tolerances required for maintaining the seal were difficult or impractical to obtain. The materials, moreover, in some cases were dimensionally unstable, having a tendency to cold flow. Changes in the temperature of the fluids above referred to also produced objectionable contraction and expansion of the material of the member.

To overcome these difficulties, in accordance with the invention the orifice member is provided with an annular groove extending about the opening and disposed outwardly of the periphery of this opening, this groove extending in depth from a face of the orifice member which is transverse to the length of the elongated element so as to interpose between the periphery of the opening and the groove a portion of the member which is capable of responding to variations in the conditions so as to maintain the desired seal while limiting friction between the member and the elongated element. The member is required to be made of a material which is resilient but of sufficient rigidity to maintain the form of the member, and the portion interposed between the annular groove and the periphery of the opening provides an expansible and contractible annulus which will accommodate changes in temperature and wear and, moreover, will make possible a dimensional relation between the diameter of the opening in the orifice member and the diameter of the elongated element which will provide for an interference of fit between these two dimensions. This dimensional relation, therefore, serves to insure that the necessary close fit of the member and the element is resiliently maintained to secure sealing without the development of undue friction.

In order to provide the desired characteristics in the material of which the orifice member is made which will secure the resilient cooperation of the interposed annulus of the member and the elongated element above mentioned as well as low friction and other characteristics, it is found that a fluorocarbon as more particularly described hereinafter and especially a polytetrafluoroethylene resin may be used in which the annular groove may be formed.

Other features relating to the form and dimensional relations of the orifice member and the annular groove formed therein with respect to each other and with respect to the elongated element will be understood from the description to follow taken in connection with the drawings in which:

FIG. 1 shows diagrammatically a metering device embodying the invention;

FIG. 2 shows in plan looking downwardly in FIG. 1 the end portion of the elongated element showing the groove therein;

FIG. 3 shows a modification of the orifice member shown in FIG. 1;

FIG. 4 shows another modification of the orifice member.

The metering device shown diagrammatically in FIG. 1 may have the general form and function as disclosed in the above mentioned application of Wallace and Kirwan, Serial No. 647,652, which utilizes an elongated element having a channel which may be of triangular section of varying depth extending along and inwardly of the exterior surface of this element and cooperating with a transverse wall in a metering chamber to define a flow orifice the area of which may be changed by movement of the elongated element through the opening in the transverse wall.

In FIG. 1 the metering device 1 comprises a left hand section provided by a wall 3 of cylindrical form extending about and concentric with the axis of an elongated movable element 5 which is supported, as hereinafter described, for movement lengthwise of its axis within the metering chamber of the device. The metering device also provides a right hand section provided by wall 7 of cylindrical form extending about and concentric with the axis of the element 5. The sections provided by the walls 3 and 7 have companion flanges 9 and 10 which are drawn together by bolts 11. The section walls 3 and 7 have formed in the adjacent ends thereof shoulders 13 and 15 forming therebetween an annular space in which is received a peripheral portion of an orifice member 17. This orifice member in the embodiment of FIG. 1 is in the form of an annular ring with parallel flat faces 19, 21 transverse to the axis and with a cylindrical periphery of such diameter as to fit into the cylindrical surfaces of the shoulders 13 and 15 respectively in the left and right hand sections of the metering device. The thickness of the annular member 17 is such that, upon tightening the bolts 11, the shoulders are brought into bearing relation to the faces 19, 21 of the member 17 to hold the member 17 in sealing relation to the left and right hand sections of the metering device and in concentric relation to the axis of the cylinders and of the elongated movable member 5.

As shown in FIG. 1 the member 17 is provided with a cylindrical portion 23 of limited length, concentric with the axis and disposed intermediate the faces 19 and 21. The member 17 is formed with conical surfaces 25, 27 concentric with the axis and converging to and meeting the cylindrical portion 23. In the particular embodiment of FIG. 1 these conical surfaces are symmetrical with respect to the median plane between and parallel to the faces 19 and 21 and the cylindrical portion 23 also is symmetrical with respect to this median plane.

In order to limit the effect of variations in machining of the surfaces and to limit the frictional engagement of the cylindrical surface 23 of the opening in the member 17 with the exterior surface of the elongated element 5, the length of the cylindrical surface 23 parallel to the axis is made as small as possible having regard, however, to the fact that a sharp edge would not provide sufficient area for bearing and resistance to wear. This axial dimension of the surface 23, therefore, is made such that the portion bearing on the exterior surface of the element 5 is in the nature of a "blunt edge." While, within the scope of the invention, the form of this "blunt edge" may be other than a cylinder, a cylindrical form is preferable for simplicity in machining and in determining the interference of fit between the member 17 and the elongated member 5 which has been referred to above.

In the member 17 is formed an annular groove 29 concentric with the axis and extending from the right hand face 21 of the member 17 parallel to the axis to a certain depth as hereinafter described. The conical surfaces 25, 27 make possible the provision of the "blunt edge" while maintaining a substantial amount of material adjacent as well as more remote from the blunt edge to form between the cylindrical surface 23 and the annular groove 29 a portion 31 which is joined to the main body of the member 17 by a connecting portion 33. The portion 31 separated from the body of the member 17 by the groove 29, by virtue of the resilience of the material of which the member 17 is made, may be enlarged and contracted concomitantly with enlargement and contraction of the cylindrical surface 23. It will be understood also that such resilient dimensional changes in the portion 31 and cylindrical surface 23 may occur concomitantly with flexure of the portion 31 with respect to the connecting portion 33. The annular groove 29 makes possible such mechanical movements of the portion 31 of the member 17 which is adjacent the exterior surface of the elongated member 5 and so accommodates to variations due to temperature or wear or other conditions which tend to change the dimensional as well as the frictional relation between the orifice member 17 and the element 5 and the sealing engagement between these two parts.

As shown in FIGS. 1 and 2 the elongated element 5 is provided with a conventional channel 35 which is of generally triangular cross section, this channel being open at the exterior surface of the element 5 and extending therealong, the depth and cross section of the channel 35 decreasing in the direction from the left end of the element 5 toward the right to a point of zero depth and area at the exterior surface of the element 5. Conventionally also the element 5 may be moved by means of a motor mechanism 37 having a reciprocating element (not shown) connected by rod 39 through a stuffing box 41 supported on the right hand section of the metering device. The rod 39 is connected to the right hand end of the element 5 in FIG. 1 so as to move the element 5 from right to left and reversely to define between the cylindrical surface 23 and the surface of the triangular section channel 35 in different positions of the element 5 orifices of different area through which the fluid delivered into the right hand section through the pipe 43 controlled by pressure reducing valve 45 may flow into the chamber provided by the left hand section. This fluid then may flow out of the left hand section through pipe 47 controlled by the pressure reducing valve 49. It will be understood that the flow is metered and controlled by suitably positioning the elongated element 5 lengthwise thereof with respect to the cylindrical portion 23 of the orifice member 17 in a manner similar to that disclosed in the application of Wallace and Kirwan, Serial No. 647,652, above referred to. The advantages which have been described, however, will be obtained by virtue of the groove 29 formed in the member 17.

In general it is found desirable to make the depth of the groove from the face of the orifice member at which it is open to the bottom of the groove somewhat greater than the distance between the same face and the far side of the cylindrical portion 23. It will be understood, when this relation is utilized, that the flexure of the annular portion 31 which has been referred to above may be developed with respect to the connecting portion 33. The thickness of the portion 33, however, must be such as to maintain sufficient rigidity of the member 17 to provide, having regard to its resilience, the desired sealing engagement of the cylindrical surface 23 with the exterior surface of the element 5.

In FIG. 3 is shown a modification of the orifice member. In this figure the orifice member 55 also is of annular form with a generally cylindrical exterior surface in which is formed a shallow groove 57 provided at its right hand, FIG. 3, with a square shoulder 59 and at its left hand with a sloping surface 61 defining an annular burr or flange 63. The groove 57 and the surface 61 are concentric with the axis of the member 55 and provide for springing the member 55 from the left into the right hand end ring portion 65 of a holder 67 having a flange 69 perpendicular to the axis. This flange 69 is of such form and dimension that, in a metering device having sections such as are provided by walls 3 and 7 and flanges 9 and 10, as in FIG. 1, the flange 69 may be held between the adjacent ends of the walls 3 and 7 instead of the orifice member 17 itself being disposed in shoulders in these ends of the walls, as in FIG. 1. By utilizing suitable materials for the holder 67 the right hand end of the member 55 may be forced through the ring portion 65 and may be snapped into place, as shown, with the end of the ring portion disposed against the shoulder 59. This method of assembly may be utilized, for example, when using a silver holder 67 and a member 55 made of polytetrafluoroethylene.

In the embodiment of FIG. 3 the member 55 is formed with a cylindrical portion 23 substantially the same as that of FIG. 1 but of larger diameter for the orifice construction for which the embodiment of FIG. 3 is suitable.

The dimension parallel to the axis of the cylindrical surface 23 in FIG. 3 is substantially the same as that of FIG. 1 to provide the blunt edge characteristic which has been described in connection with that embodiment. In the embodiment of FIG. 3, however, while the angle of the surface 27 at the entrance side of the cylindrical surface 23 is the same as that of FIG. 1, the angle at the exit side is greater and the member 55 is provided with a cylindrical surface 68 defining a cylindrical exit space to which the conical space defined by the surface 25 leads. In this embodiment the entrance angle is 15° with respect to the axis of the member 55 and the exit angle is 30°.

In this embodiment also it will be noted that the groove 29 is disposed generally in the same relation to the cylindrical surface 23 as in FIG. 1 and extends to such a depth that the portion 71 becomes the portion upon which the annular portion 31 disposed between the groove 29 and the cylindrical surface 23 may flex. The function of the annular portion 31 and of the groove 29 in this embodiment are the same as that described in connection with FIG. 1.

The embodiment of FIG. 4 is similar to that of FIG. 3 in providing a holder 67 having flanges 69 for engaging the flanges 9 and 10 of the left and right sections of FIG. 1 in the same manner as described in connection with FIG. 3. In the embodiment of FIG. 4 the orifice member 75 is provided with a cylindrical surface 23 and with a conical surface 77 at the entrance side of the member 75 and with a conical surface 79 at the exit side of the surface 23. In this embodiment both the entrance angle and the exit angle respectively of surfaces 77, 79 are 30° with respect to the axis. The annular groove 29 is similarly outwardly disposed with respect to the cylindrical surface 23 and extends to such a depth from the face of the member 75 as to provide a portion 81 between the bottom of the groove and the exit conical surface 79 which provides for resilient flexure of the annular portion 31 in the manner described in connection with the other embodiments.

In the embodiment of FIG. 4 also the orifice member 75 may be sprung into a holder from the left to dispose the right hand end portion 65 of the holder 67 in a shoulder 57 as described in connection with FIG. 3. The depth of the groove 29, however, is such that the bottom end thereof is disposed sufficiently beyond the cylindrical portion 23 in the direction from the face of the member 75 at which the groove 29 is open so as to secure the desired resilient flexure of the portion 31 about the connecting portion 81.

In all of the embodiments of FIGS. 1, 3 and 4, as above stated, it is desirable to reduce the width of the cylindrical portion 23 of the orifice member while at the same time avoiding a sharpe edge. It is found, when the orifice members 17, 55 and 75 are made of a material having the physical properties such as are provided by a polytetrafluoroethylene resin, the length of the cylindrical portion 23 parallel to the axis may be approximately .032 inch with a tolerance of ± .005 inch and that this dimension may be the same for the different orifice members which are designed to cooperate with elongated elements or rods 5 of different diameters. The nominal size of the rods shown in FIGS. 1, 3 and 4 respectively are ⅜", ¾" and 1½". It will be understood, however, that the entrance and exit angles referred to and other dimensions may be varied to suit different diameters of the rod and to provide for practical machining and fitting of the orifice members to the holders and, as well, to provide the requisite flexure of the annular portion 31. Within the scope of the invention the width of the cylindrical surface 23 in the direction parallel to the axis may be between 0.020 inch and 0.075 inch. The width of the annular groove 29 may be approximately ³⁄₆₄ inch or in some cases greater. Where manufacturing conditions permit the width of this groove may be reduced to about ¹⁄₃₂ inch. The depth of this groove is determined, as above stated, by the relation of the bottom of the groove to the exit portion of the orifice member to secure the desired flexure while at the same time maintaining the annular portion 31 in sealing engagement with the exterior surface of the rod by virtue of the strain developed in this annular portion interposed between the groove and the cylindrical surface 23. The thickness of the annular interposed portion 31 may be substantially between ¹⁄₁₆" and ⁷⁄₆₄" for an orifice member of a material such as polytetrafluoroethylene.

When utilizing for the orifice member a semi-rigid resilient plastic material, such as polyteterafluoroethylene, it also is found that the interference of fit which becomes permissible is of substantionally greater range in the device of the invention utilizing the annular groove 29 than has been possible heretofore. Whereas an interference of fit of only 0 to .001 inch heretofore has been permissible to secure the requisite cooperation of the parts, in the device of the invention this interference of fit may be in the range of .004 inch to .0065 inch for the polytetrafluoroethylene. In general the range of this interference of fit may be between 0.001 inch and 0.010 inch.

While in the embodiments disclosed the orifice member is disposed with the open end of the groove 29 disposed toward the upstream end of the metering device, within the scope of the invention the orifice member may be supported so that the open end of this groove is disposed downstream in the device. In some cases upon such reversal the angles respectively at the sides of the surface 23 with respect to the face at which the groove is open may be maintained, having regard to the dimensions requisite for securing the flexure of the annular portion 31. In other cases corresponding changes may be made in the entrance and exit angles to secure the desired fluid flow conditions at the entrance side and at the exit side of the orifice defined between the cylindrical surface 23 and the surfaces of the groove 35.

The material suitable for the purposes of the invention may be described as semi-rigid, resilient, and having a low coefficient of friction. In order to secure the desired cooperation of the orifice member with the channelled elongated element, the modulus of elasticity should be low. To suit the conditions where substantial variations in temperature may occur, the coefficient of thermal expansion also should be low. To resist chemical action a chemically inert material should be used.

Having regard to conditions for fabrication or machining the orifice member, it has been found that the above mentioned characteristics may be provided by a fluorocarbon material. Such material may be a perhalogenated polyethylene in which at least one of the halogen atoms is fluorine and it may be a fluorocarbon selected from the group which comprises a polymer of tetrafluoroethylene and a polymer of trifluorochloroethylene. The preferred material is a polymer of tetrafluoroethylene which is hard and has a very low coefficient of friction and a low modulus of elasticity as well as a coefficient of thermal expansion low enough to provide for substantial variation in temperature without interfering with the cooperation of the semi-rigid, resilient material of the orifice member with the elongated channelled element in the manner which has been described. This fluorocarbon, moreover, is inert to the chemical action and has a low adhesive characteristic which is favorable for the purposes of the invention.

Without departing from the invention other modifications may be made in the dimensions, arrangement and materials utilized for the parts and in other respects while maintaining the feature of the annular groove formed in the orifice member for the purposes described and as defined in the appended claims.

I claim:

1. In a fluid metering device providing a chamber, an elongated meter element, and means for supporting said element for movement thereof lengthwise thereof within said chamber, said elongated element having an exterior surface of uniform peripheral contour along its length, said element being provided with an open channel extending lengthwise thereof, the combination with said metering device of a member disposed within said chamber and having an opening therein through which said elongated element moves lengthwise thereof, the periphery of said opening engaging said exterior surface of said element and extending across said channel to define with said channel an orifice at different positions of said element in said lengthwise movement thereof, said member being provided with a groove extending about and being outwardly spaced from said periphery of said opening of said member, said groove extending into said member from a face thereof transverse to the length of said element to define an annular portion of said member interposed between said periphery of said opening of said member and said groove, said member being formed of a material which comprises a perhalogenated polyethylene in which at least one of the halogen atoms is fluorine to provide a semi-rigid resilient inert organic plastic having a low coefficient of friction and capable of providing for slight elastic yielding of said annular portion in the radial direction to provide for movement of said elongated element through said opening in engagement with the peripheral surface of said opening with an interference of fit, said plastic being sufficiently rigid substantially to maintain the form of said member and of said opening therein so as to maintain sealing upon said exterior surface of said elongated element and with said annular portion rigidly spanning across said channel, so that the peripheral surface of said opening along said annular portion precisely defines said metering orifice with said channel.

2. In a fluid metering device the combination as defined in claim 1 in which said elongated element is a rod providing a cylindrical exterior surface and said opening in said member has a circular periphery, said groove being circular about and concentric with said circular opening.

3. In a fluid metering device the combination as defined in claim 1 in which the material of said member comprises a polymer of tetrafluoroethylene.

4. In a fluid metering device the combination as defined in claim 1 in which the material of said member comprises a polymer of trifluorochloroethylene.

5. In a fluid metering device the combination as defined in claim 1 in which the material of said member comprises a polymer of a chlorofluoroethylene.

6. In a fluid metering device the combination as defined in claim 1 in which the peripheral surface of said opening has a portion of restricted length in the direction along said elongated element to approximate a blunt edge surface for engaging said element, and a portion converging to said blunt edge surface to provide a converging flow space about said element adjacent said portion of said surface of restricted length.

References Cited in the file of this patent

UNITED STATES PATENTS

| | | |
|---|---|---|
| 1,579,600 | Durante | Apr. 6, 1926 |
| 1,589,239 | Scott | June 15, 1926 |
| 2,344,657 | Thiel | Mar. 21, 1944 |
| 2,358,611 | Ziebolz | Sept. 19, 1944 |
| 2,509,656 | Tomoser | May 30, 1950 |
| 2,602,592 | Tomoser | July 8, 1952 |
| 2,738,159 | Fleming | Mar. 13, 1956 |
| 2,899,980 | Loebel et al. | Aug. 18, 1959 |
| 2,929,393 | Wallace et al. | Mar. 22, 1960 |

FOREIGN PATENTS

| | | |
|---|---|---|
| 908,088 | Germany | Apr. 1, 1954 |

OTHER REFERENCES

"Modern Plastics" (1), vol. 30, No. 4, December 1952, article entitled Fluorocarbons, commencing on page 79; page 86 relied upon. (Copy in Scientific Library, and in Div. 11, class 138—Teflon Digest.)

"Modern Plastics Encyclopedia" (2), vol. 36, No. 1A, 1959, page 854. (Copy in Scientific Library, and in Div. 11, class 138—Teflon Digest.)